United States Patent [19]

Mao et al.

[11] Patent Number: 5,582,732
[45] Date of Patent: Dec. 10, 1996

[54] BIOLOGICAL METHOD OF WASTE WATER TREATMENT

[75] Inventors: Huazhong Mao; Jose J. Lourenco, both of Edmonton, Canada

[73] Assignee: Aquatex Corporation, Edmonton, Canada

[21] Appl. No.: 444,751

[22] Filed: May 19, 1995

[30] Foreign Application Priority Data

Mar. 31, 1995 [CA] Canada ................................... 2146062

[51] Int. Cl.⁶ ...................................................... C02F 3/06
[52] U.S. Cl. .......................... 210/603; 210/610; 210/617; 210/631; 210/903
[58] Field of Search ...................... 210/603, 605, 210/610–612, 614–618, 630, 631, 903, 906, 908, 909

[56] References Cited

U.S. PATENT DOCUMENTS

| | | | |
|---|---|---|---|
| 4,297,122 | 10/1981 | Wallace | 210/610 |
| 4,983,299 | 1/1991 | Lupton et al. | 210/617 |
| 5,062,958 | 11/1991 | Bateson et al. | 210/611 |
| 5,078,884 | 1/1992 | Mulder | 210/611 |
| 5,217,616 | 6/1993 | Sanyal et al. | 210/617 |
| 5,286,385 | 2/1994 | Jorgensen et al. | 210/610 |
| 5,403,487 | 4/1995 | Lodaya et al. | 210/610 |
| 5,480,551 | 1/1996 | Chudoba et al. | 210/610 |

*Primary Examiner*—Thomas S. Wyse
*Attorney, Agent, or Firm*—Anthony R. Lambert

[57] ABSTRACT

A method of treating waste water is described. Firstly, providing specially acclimatized microbial consortia with relatively low sensitivity to changes in pH and changes in temperature, such that the microbial consortia is capable of metabolizing contaminants efficiently within a predetermined broad pH range and broad temperature range. Secondly, maintain the microbial consortia in a space limited and a substrate limited mode within an immobilized bioreactor operating within the predetermined pH range and the predetermined temperature range. Thirdly, introduce waste water with liquified insoluble organic contaminants into the immobilized bioreactor. The organic contaminants are metabolized by the microbial consortia working under space limited and substrate limited conditions, thereby treating the waste water with a minimal sludge production rate.

20 Claims, 6 Drawing Sheets

BIOLOGICAL METHOD OF WASTE WATER TREATMENT

FIELD OF THE INVENTION

The present invention relates to a biological method of waste water treatment which utilizes a specially acclimatized microbial consortia immobilized in an immobilized bioreactor.

BACKGROUND OF THE INVENTION

A commonly accepted biological waste water treatment is the "activated sludge" method. It is critical that the activated sludge be in sufficient concentration to effectively purify the waste water. The process is continuous flow; as raw waste water enters the activated sludge plant, it is aerated in an aeration chamber and then introduced into a settling tank. Clarified water is drawn from the settling tank and the settled sludge is partially recycled back into the aeration chamber to maintain the desired concentration of active biomass.

As living organisms synthesize new cells and die, "activated" sludge is created. Surplus sludge is diverted into a sludge handling system, also referred to as a "clarifier". In this sludge handling system, the surplus sludge is first concentrated, and then sent to a sludge digester to further reduce its volume and organic content. The digested sludge is then transported to a landfill site for final disposal.

The primary processing of the waste water through the aeration chamber and the settling tank typically takes between 12 and 18 hours. The secondary processing of the excess sludge typically takes from 24 hours to 7 days depending upon the efficiency of the sludge handling system.

The activated sludge process unavoidably produces an enormous amount of excess sludge. The ongoing production of sludge is considered to be a positive sign that the process is operating properly. If the aeration chamber were to produce reduced quantities of sludge or stop producing sludge altogether that would be considered to be a sign indicating an operational problem. The activated sludge must be present in sufficient concentration for contaminants in the waste water to be effectively removed by the microbial activities. The sludge must remain "activated"; ie. it must have a sufficient proportion of living organisms that utilize the contaminants as food or substrate. A reduction in the quantity of sludge is a sign that the microbial consortia has difficulty to maintain their population. If the reproduction rate were to continue to drop the activated sludge would eventually cease to be "activated". With a healthy activated sludge method, approximately 0.4 to 0.8 pounds of sludge is produced for each pound of BOD removed. Approximately 90 percent of the sludge produced eventually must be handled by the sludge handling system. In excess of 30% of the sludge ultimately ends up being disposed of at landfill sites; although this percentage can vary depending upon the efficiency of the waste water treatment process. The secondary treatment and ultimate landfill disposal of excess sludge has enormous costs associated with it.

SUMMARY OF THE INVENTION

What is required is a biological method of waste water treatment utilizing microbial consortia in which the amount of sludge produced is greatly reduced.

According to the present invention there is provided a method of treating waste water. Firstly, providing specially acclimatized microbial consortia with a low sensitivity to changes in pH and changes in temperature, such that the microbial consortia is capable of metabolizing contaminant efficiently within a predetermined broad pH range and broad temperature range. Secondly, maintain the microbial consortia in a space limited mode within an immobilized bioreactor operating within the predetermined pH range and the predetermined temperature range. Thirdly, introduce waste water with liquified insoluble organic contaminants into the immobilized bioreactor. The organic contaminants are metabolized by the microbial consortia working under space limited conditions, thereby treating the waste water with a minimal sludge production rate.

The philosophy behind the method, as described above, is completely different to the philosophy underlying the activated sludge method. The present method is based upon creating an environment in which the microbial consortia will exhibit a desired metabolization behaviour. It is preferred that a media for immobilization of the microbial consortia be used having a porosity of between 10 and 45 pores per inch. In order to prevent an over-agglomeration of the microbial consortia on the surface of the immobilization media it is preferred that the immobilized bioreactor be configured such that the flow pattern through the immobilized bioreactor will shear the microbial consortia from the exposed surface of the immobilization media, thereby leaving the microbial consortia in a space limited mode. This also assists in effective transfer of substrate to the microbial consortia immobilized within the pores of the media. It is also preferred that the microbial consortia be placed in a substrate limited mode. When placed under conditions in which they are both space limited and substrate limited, the microbial consortia will synthesize new cells only to the extent that space and nutrients become available within the pores. When some of the microorganisms die, they are liquified and the biodegradable organisms released serve as additional substrate for the rest of the living and new microorganisms. In case of full occupation of the pores, until space becomes available by the death of microorganisms, the majority of the mature microorganisms continue metabolization with little reproduction. With reproduction limited, as described, a waste water treatment system can be designed with a negligible sludge production rate.

Once the basic teachings of the present method are understood, it is possible to utilize a number of immobilized bioreactors with specially acclimatized microbial consortia to develop waste water treatment systems suitable for treating different types of waste water. The best mode of waste water treatment for incorporation in a flexible all-purpose system, as will hereinafter be described, should include an anaerobic immobilized bioreactor, an anoxic immobilized bioreactor, an aerobic immobilized bioreactor, and a nitrification immobilized bioreactor arranged in desired series to accommodate a continuous flow of waste water. It will be appreciated that systems can be customized to treat particular types of waste water and not all of these immobilized bioreactors will necessarily be required.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
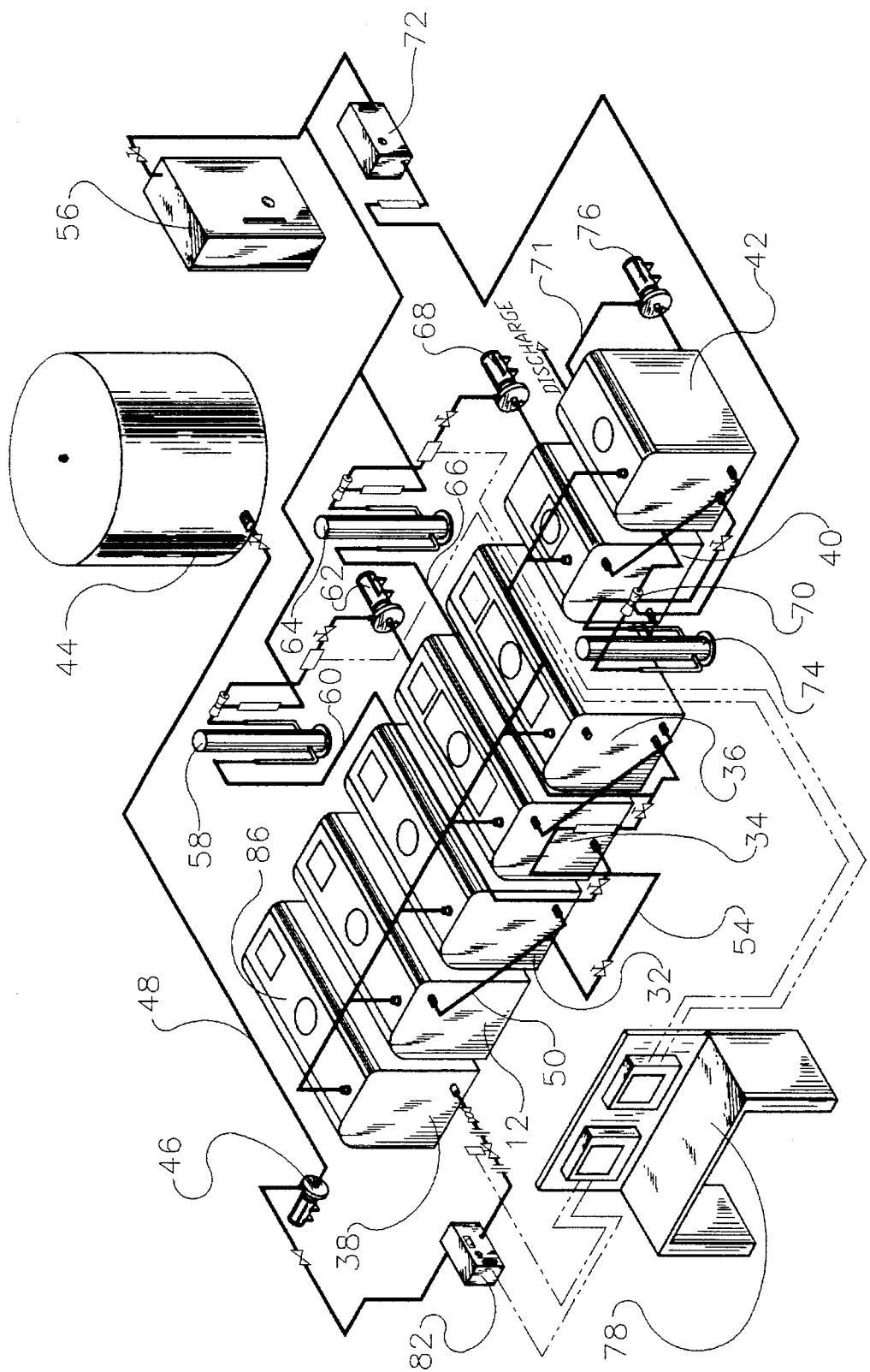
FIG. 1 is a perspective view of a waste water treatment system constructed in accordance with the teachings of the present method.
Figure 2:
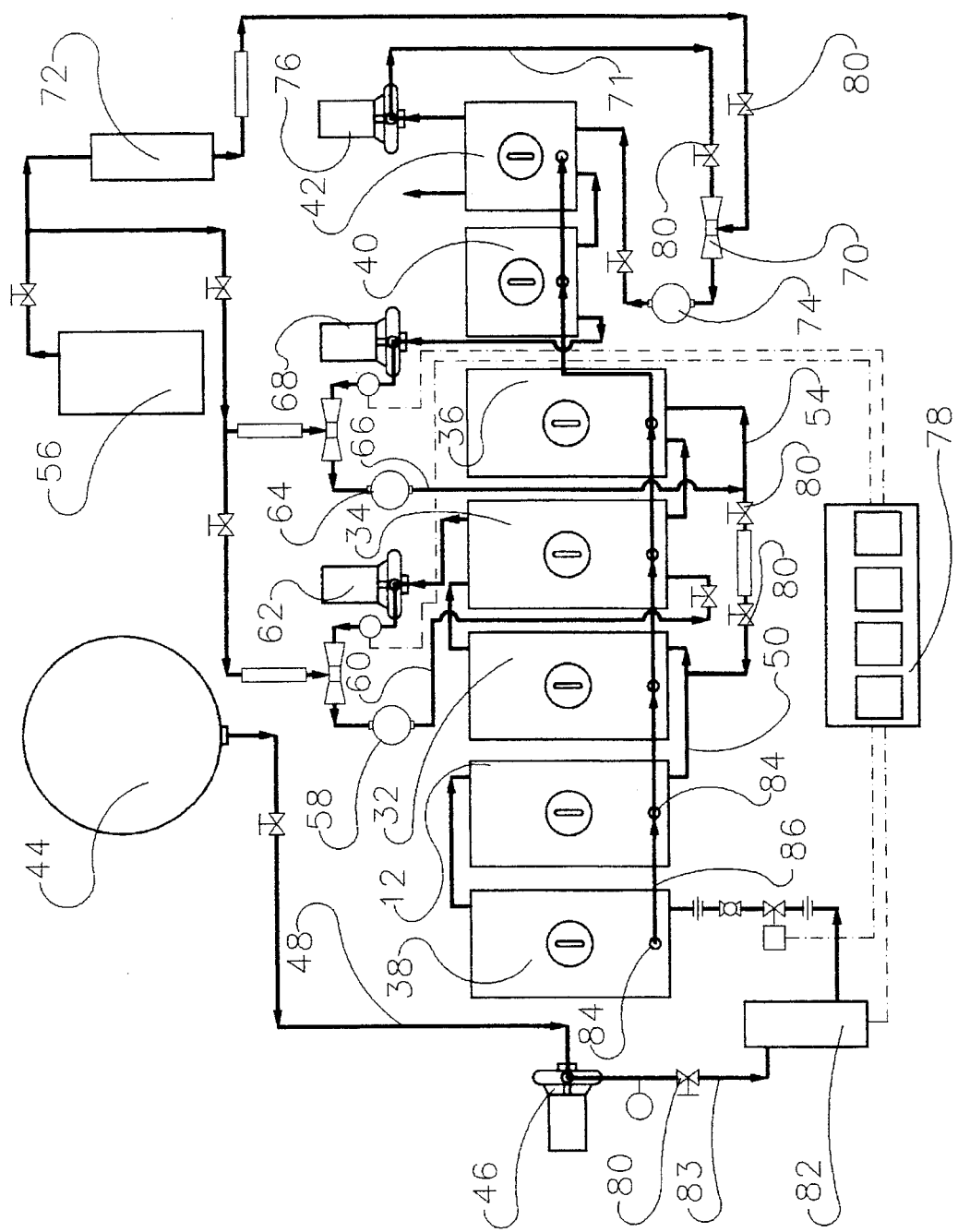
FIG. 2 is a top plan view of the waste water treatment system illustrated in FIG. 1.
Figure 3:
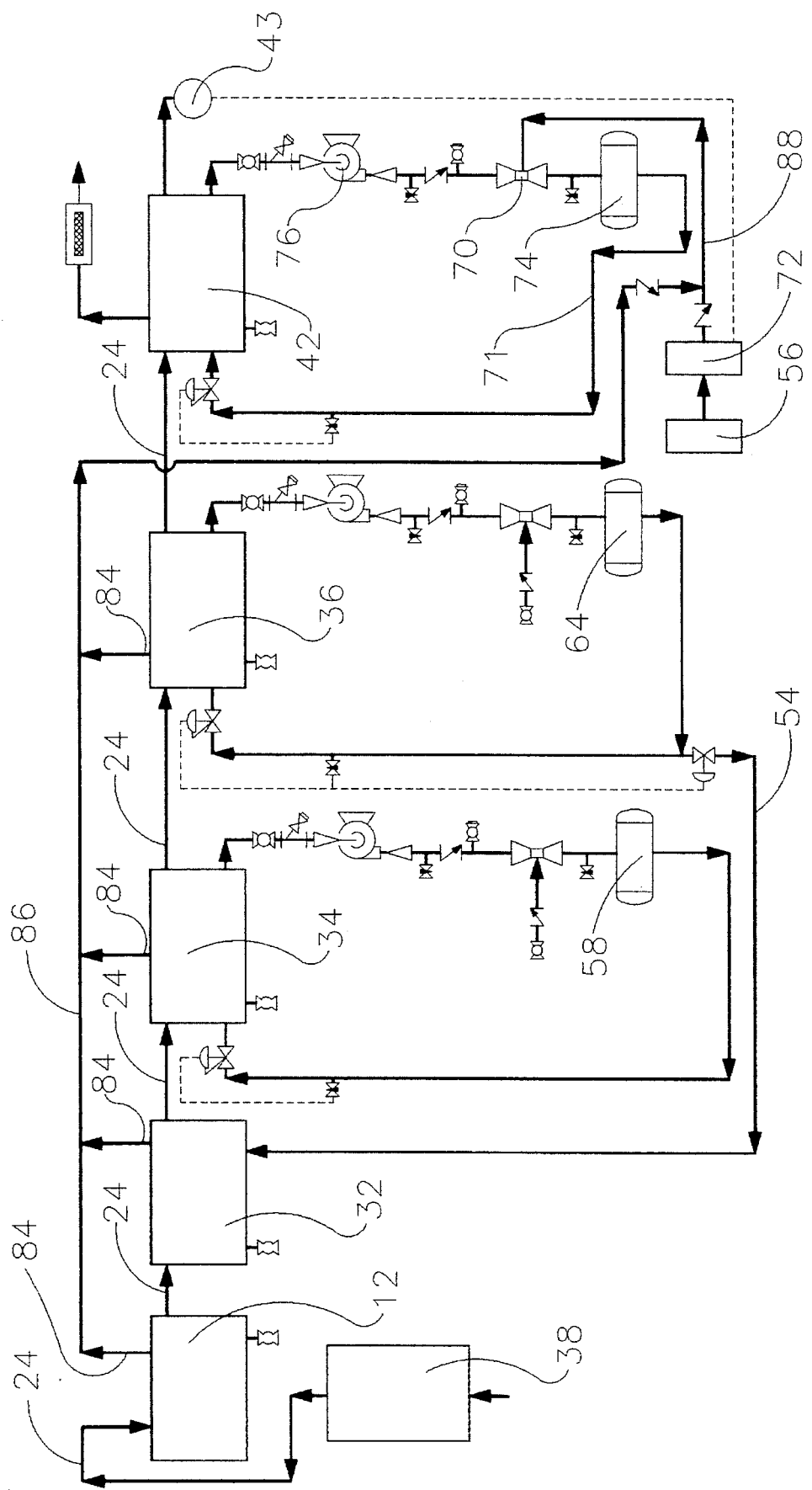
FIG. 3 is a simplified schematic view of the waste water treatment system illustrated in FIG. 1.
Figure 6:
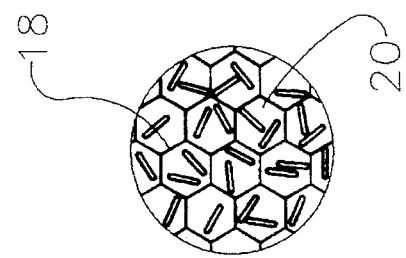
FIG. 6 is a magnified view of the immobilization media in FIG. 5.

The preferred embodiment, a waste water treatment system generally identified by reference numeral 10, will now be described with reference to FIGS. 1 and 2.

Waste water treatment system 10 has been developed in accordance with the teachings of the present method. It will be appreciated that the teachings of the method can be applied to a single immobilized bioreactor. The multiple immobilized bioreactor configuration illustrated represents a best mode of waste water treatment, particularly developed for tertiary treatment of domestic sewage.

In its most elementary form the method consists of three steps. Firstly, provide specially acclimatized microbial consortia with low sensitivity to changes in pH and changes in temperature, such that the microbial consortia is capable of efficiently metabolizing the contaminant within a predetermined broad pH range and broad temperature range. Secondly, maintain the microbial consortia in a space limited and a substrate limited mode within an immobilized bioreactor operating within the predetermined pH range and the predetermined temperature range. Thirdly, introduce waste water with liquified organic contaminants into the immobilized bioreactor. The organic contaminants are metabolized by microbial consortia working under the space limited and substrate limited conditions, thereby treating the waste water with a minimal sludge production rate.

Figure 5:
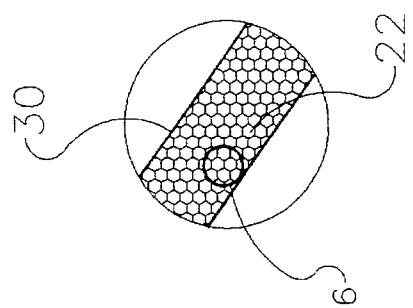
FIG. 5 is a detailed view of the immobilization media in FIG. 4.
Figure 4:
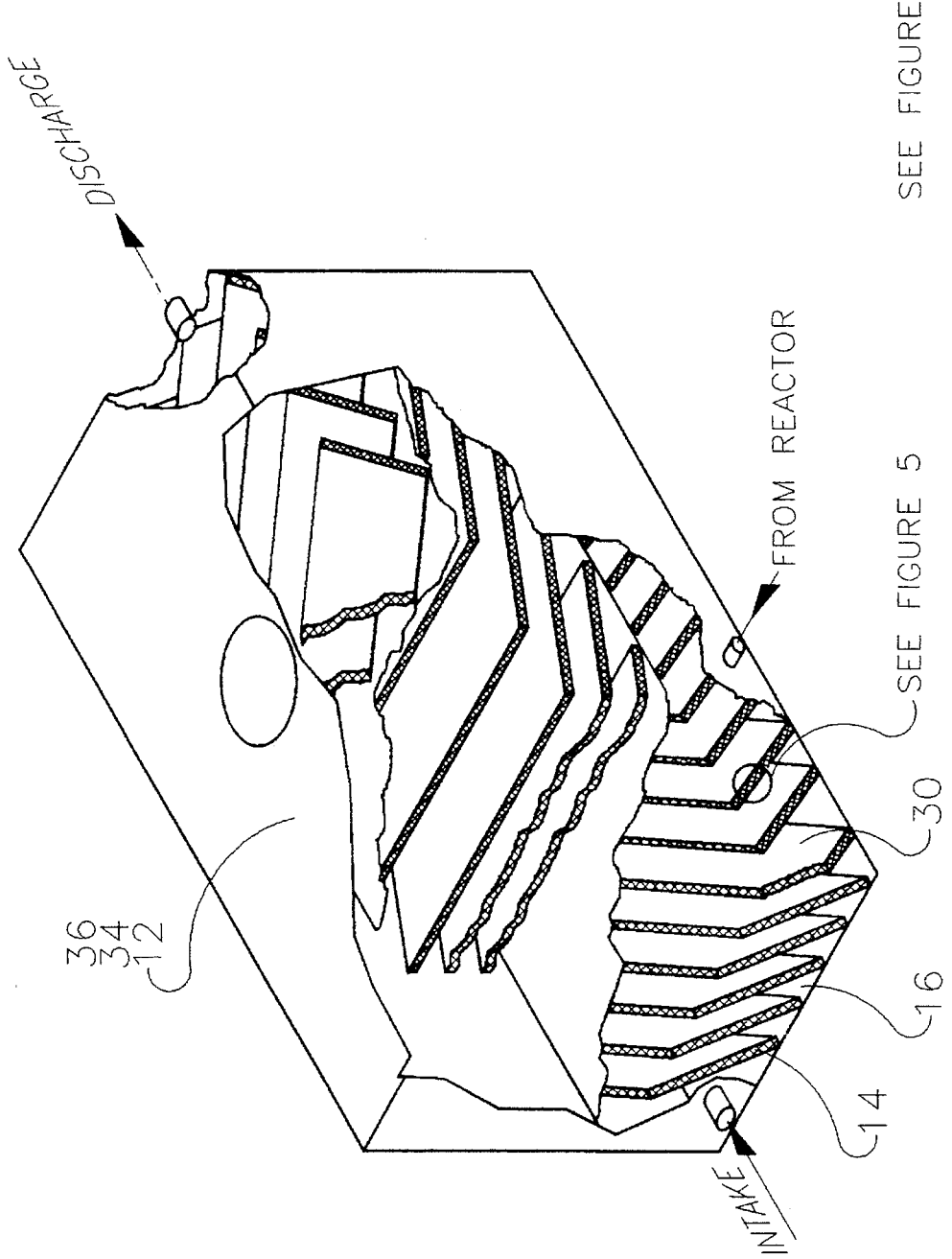
FIG. 4 is a partially cut away perspective view of one of the immobilized bioreactors in FIG. 1.
Figure 7:
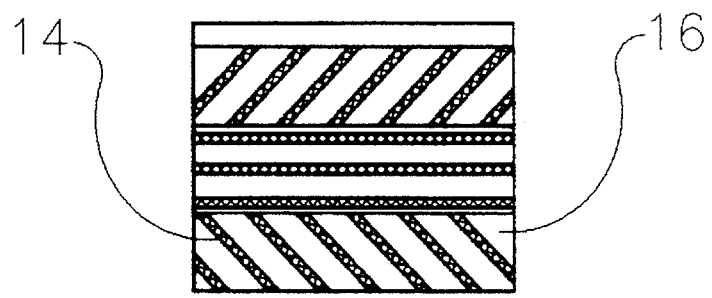
FIG. 7 is an end elevation view in transverse section of the immobilization media in FIG. 4.
Figure 8:
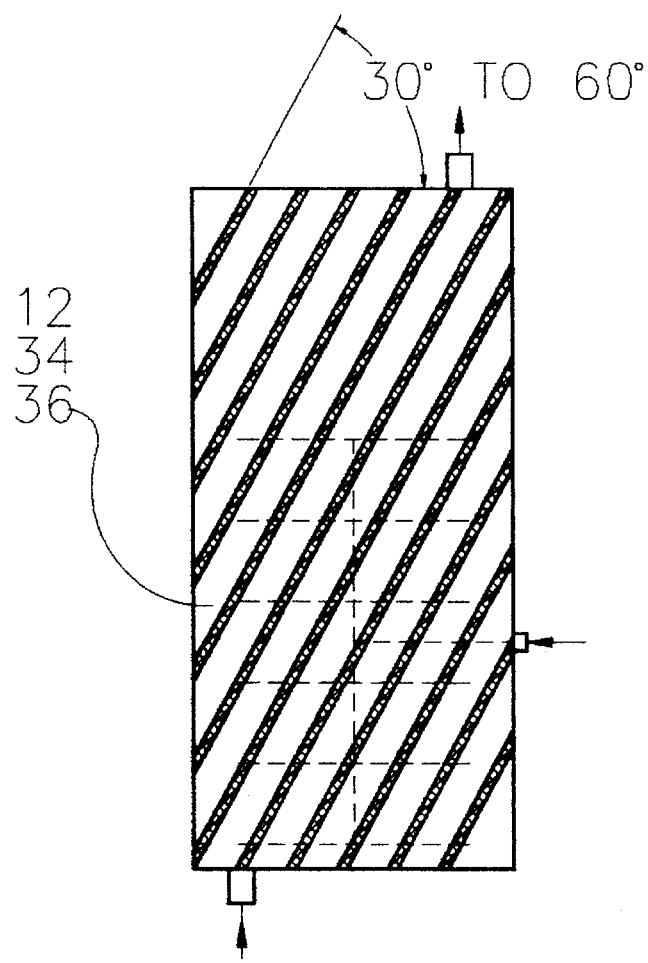
FIG. 8 is an side elevation view in longitudinal section of a top layer of baffle-like immobilization media surface in FIG. 4.
Figure 9:
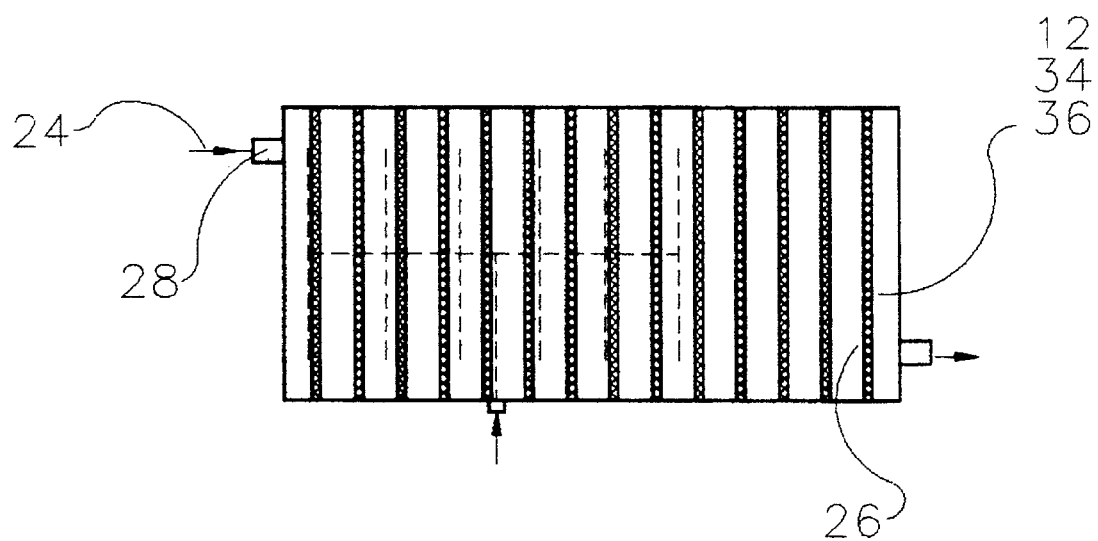
FIG. 9 is an side elevation view in longitudinal section of a middle layer of baffle-like immobilization media surface in FIG. 4.
Figure 10:
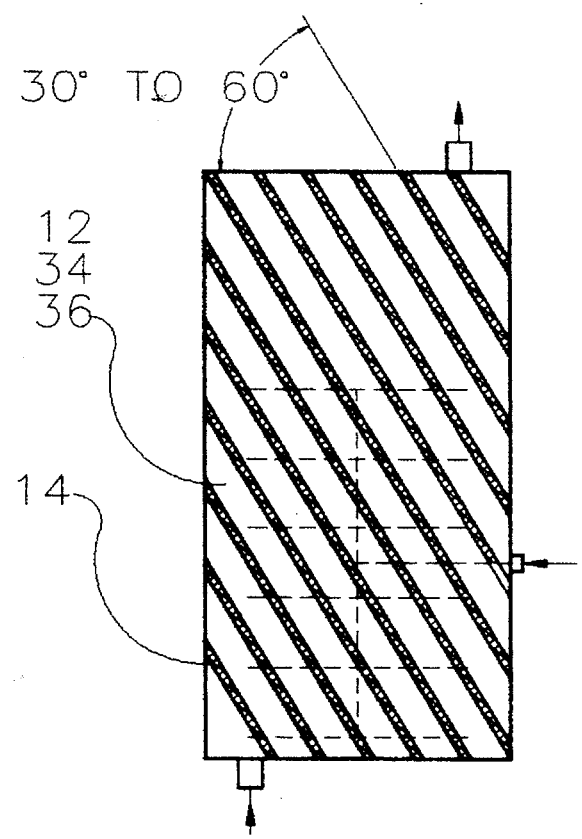
FIG. 10 is an side elevation view in longitudinal section of a bottom layer of baffle-like immobilization media surface in FIG. 4.

This can best be understood with reference to a single immobilized bioreactor 12 by referring to FIG. 4. Firstly, immobilized bioreactor 12 has a substantially vertical plug flow pattern defined by a plurality of baffle-like media surface 14. Channels 16 between media surface 14 are between 0.25 to 0.75 of an inch in order to allow for gases and other end products to be effectively carried away. Baffle-like media surfaces 14 are in a zig-zag pattern with angles of between 30 and 60 degrees. The desired angle is dependent upon the solids content. When the solids content is low an angle of 30 degrees is adequate. When the solids content is high the angle must be increased to closer to 60 degrees. When designing an all purpose system an angle of 45 degrees is preferred. Secondly, referring to FIG. 5, immobilized microbial consortia 18 within pores 20 of an immobilization media 22 mounted onto media surface 14 within immobilized bioreactor 12. Immobilization media 22 should have porosity of between 10 to 45 pores 20 per inch. The size of pores 20 and the porosity of immobilization media 22 depends upon microbial consortia 18 and the requirements for the particular waste water treatment application. Typically, there are between approximately 10 to the 7th power and 9th power of microbial cells 18 in each one cubic centimeter of space, depending upon the substrate loading of the bioreactor. Thirdly, introduce stream 24 with liquified organic contaminants 26 into immobilized bioreactor 12 through inlet 28. Immobilized bioreactor 12 also serves as a clarifier. As the flow passes up the various angles of media surface 14, some particulate organic contaminants 26 fall down upon microbial consortia 18. There the particulate organic contaminants 26 are liquified and partially removed or carried away. There is a tendency for microbial consortia 18 to attempt to spread onto surface 30 of immobilization media 22. However, in the illustrated configuration microbial consortia 18 is continuously sheered from surface 30 of immobilization media 22 which is exposed to the flow of stream 24. This limits the thickness of the biofilm on surface 30 to less than 500 microns, and maintains microbial consortia 18 in space limited and substrate limited modes within pores 20. It will be appreciated that when continuous sheering is referred to, it does not mean that a biofilm of a greater thickness develops and is sheered. If this were the case the sheering of the biofilm itself would produce sludge. What actually happens is that the sheer force of the water continuously flowing past prevents a build upon from occurring in the first place. Sludge production as a result of this sheering action is minimal. An environment is created on the baffle-like media surfaces 14 that is not conducive to development of a biofilm any thicker than 500 microns. A majority of organic contaminants 26 are metabolized by microbial consortia 18 within pores 20, thereby treating stream 24 with a negligible sludge production rate. It will be understood that the size of pores 20 serves to regulate a balance between cell reproduction and metabolization. When there is no longer any room within pores 20 for cell reproduction, microbial consortia 18 will continue to metabolize without reproducing. Microbial consortia 18 will synthesize new cells only to the extent that space and substrate becomes available within pores 20.

The best mode illustrated in FIGS. 1 and 2, will now be described. Firstly, place in desired series order to accommodate a continuous stream of waste water 24 an anaerobic immobilized bioreactor 12, an anoxic immobilized bioreactor 32, a aerobic immobilized bioreactor 34, and a nitrification immobilized bioreactor 36. Also illustrated as part of the best mode of waste water treatment is a buffering tank 38, a polishing immobilized bioreactor 40, and (if desired) a disinfection tank 42 and a waste water storage tank 44. Secondly, immobilized microbial consortia 18 within pores 20 of immobilization media 22 positioned within each of immobilized bioreactors 12, 32, 34, 36, and 40. Thirdly, introduce stream 24 with liquified organic contaminants 26 into anaerobic immobilized bioreactor 12. In the best mode, it is recommended that rather than introducing stream 24 from waste water storage tank 44 into anaerobic immobilized bioreactor 12 directly, that such introduction be indirectly through buffering tank 38. A waste water stream 24 is delivered by pump 46 from waste water storage tank 44 to buffering tank 38 via conduit 48. Buffering tank 38 is intended solely to lessen shock loading to the process. The flow pattern through anaerobic immobilized bioreactor 12 has previously been described with reference to FIGS. 4 and 5. The space limited microbial consortia 18 treats stream 24 converting organic contaminants 26 with a minimal sludge production rate. Converted organic contaminants are removed in a timely fashion as will hereinafter be further described.

Fourthly, introduce stream 24 leaving anaerobic immobilized bioreactor 12 via conduit 50 into anoxic immobilized bioreactor 32 in a substantially vertical plug flow pattern with the liquified organics serving as a carbon and energy source 52. Nitrite and Nitrate produced in nitrification immobilized bioreactor 36 are introduced from nitrification immobilized bioreactor 36 via conduit 54 into immobilized anoxic bioreactor 32. As with anaerobic immobilized bioreactor 12, anoxic immobilized bioreactor 32 maintains microbial consortia 18 in a space limiting and substrate limiting mode. Nitrite (NO2) and Nitrate (NO3) are converted into N2, NO and NO2 by the space limited and substrate limited microbial consortia 18 in anoxic immobilized bioreactor 32, thereby treating stream 24 with a minimal sludge production rate.

Fifthly, introduce stream 24 leaving anoxic immobilized bioreactor 32 into aerobic immobilized bioreactor 34 which is maintained with at least 4 milligrams per litre and preferably 8 milligrams per litre of dissolved oxygen gas. Oxygen gas is provided by a oxygen generator 56 and is injected through a venturi into a mass transfer reactor 58 where the oxygen is effectively dissolved in almost saturated concentrations in the liquid stream, which is pumped by pump 62 via conduit 60 into aerobic immobilized bioreactor 34. The stream saturated with dissolved oxygen is added to the bottom of aerobic immobilized bioreactor 34 and rises up through media surface 14 that hold immobilization media 22. The high concentration of dissolved oxygen increases the ability of microbial consortia 18 to metabolize organic contaminants 26. At the same time, the high ratio of dissolved oxygen to organic contaminants 26 facilitates a portion of the microbial consortia going into an endogenous state under substrate limited mode. As with the other immobilized bioreactors, microbial consortia 18 is maintained in a space limiting or substrate limiting mode. Organic contaminants 26 are metabolized by the space limited and substrate limited microbial consortia 18 thereby treating stream 24 with a minimal sludge production rate. The porosity of immobilization media 22 in aerobic immobilized bioreactor 34 is preferably between 20 and 45 pores per inch.

Sixthly, introduce stream 24 leaving aerobic immobilized bioreactor 34 into nitrification immobilized bioreactor 36 which is maintained with at least 5 milligrams per litre of dissolved oxygen. The optimum is 8 milligrams per litre of dissolved oxygen. Oxygen is provided by oxygen generator 56 and is injected through a second mass transfer reactor 64 where the oxygen is dissolved in almost saturated concentrations in liquid, which is then injected via conduit 66 into nitrification immobilized bioreactor 36. Nitrification immobilized bioreactor 36 is a two phase bioreactor. Approximately 30 per cent of the bioreactor is plug flow. The remaining 70 per cent functions as a CSTR bioreactor with the energy for the continuous mixing being provided a stream delivered by pump 68. The dissolved oxygen is added to the bottom of nitrification immobilized bioreactor 36 and rises up through media surface 14 that hold immobilization media 22. A typical microbial consortia can remove 5 to 15 grams of ammonia nitrogen per cubic meter of bioreactor volume. Microbial consortia 18 in nitrification immobilized bioreactor 36 is specially acclimatized, however, to have an ammonia nitrogen removal efficiency of two to three times that level. In nitrification immobilized bioreactor 36, steps are taken to reduce the concentration of microbial consortia 18. The healthy microbial consortia 18 that has been ammonia nitrogen preconditioned more effectively is in the first 30% of nitrification immobilized bioreactor 36 that is subject to the highest concentrations of ammonia nitrogen. The high concentration of dissolved oxygen increases the ability of these microbial consortia 18 to metabolize ammonia nitrogen to NO3 and NO2. In the rest of the nitrification immobilized bioreactor, the high ratio of dissolved oxygen to substrate results in a portion of the microbial consortia going into an endogenous state. As with the other immobilized bioreactors, microbial consortia 18 is maintained in a space limited or substrate limited mode. Ammonia is metabolized by the space limited or substrate limited microbial consortia 18 thereby treating stream 24 with a minimal sludge production rate. In this process no pH control is required. The specially acclimatized microbial consortia used in this process can effectively remove NH3 at pH levels as low as 5.10. This is to be contrasted with conventional processes in which a minimum pH of 7.0 must be maintained at all times, with an optimum pH being 8.5. The porosity of immobilization media 22 is between 30 and 60 pores per inch. It is preferred that the porosity of immobilization media 22 be maintained at 45 pores per inch.

Once stream 24 has passed through nitrification bioreactor 36 its purification is essentially complete. It is preferred, however, that stream 24 also be subject to processing through polishing immobilized bioreactor 40, disinfection tank 42. Polishing immobilized bioreactor 40 represents approximately 5% of total immobilized bioreactor volume. Polishing immobilized bioreactor 40 differs from the other immobilized bioreactors only to the extent that a heterogeneous microbial consortia 18 is used. Microbial consortia 18 in the other immobilized bioreactors is homogeneous and intended to serve a particular function in removing a specific organic contaminant from stream 24. In contrast, the heterogeneous microbial consortia 18 in polishing immobilized bioreactor 40 is intended to remove whatever organic contaminants 26 remain in stream 24. Those remaining organic contaminants 26 are generally in minute quantities. It is preferred that the angle of media surface 14 be fairly pronounced, in the magnitude of 45 degrees. The porosity in immobilization media 20 is preferably 45 pores per inch. Polishing immobilized bioreactor 40 functions as a clarifier. The thickness of immobilization media 22 is preferably between ¼ to ½ of an inch. Channels 16 between media surface 14 represent a spacing of ¼ to 1 inch, depending upon hydraulic loading. Heterogeneous microbial consortia 18 is maintained in a space limiting or substrate limiting mode. The organic contaminants are metabolized by the space limited and substrate limited microbial consortia 18 thereby treating stream 24 with a minimal sludge production rate. Stream 24 leaving polishing immobilized bioreactor 40 is introduced into disinfection chamber 42. Concurrently, ozone generated from pure oxygen is injected by injectors 70 into a recycling loop 71 that recycles continuously into disinfection chamber 42. As stream 24 is introduced into disinfection chamber 42, exposure to ozone over a prolonged residence time destroys microorganisms remaining in treated stream 24. The ozone required is monitored by an ORP Sensor 43 located in disinfection chamber 42. The liquid in disinfection tank 42 is continuously recirculated around recycling loop 71 by pump 76.

Further features illustrated in FIGS. 1 through 5, will now be described. The monitoring of operations, and the control of the process is via control panel 78. Valves 80 are positioned on all conduit to enable any of the immobilized bioreactors to be isolated for purpose of maintenance. A mass flow meter 82 is provided on conduit 83 for the purpose of flow control. It was previously mentioned that the metabolized waste in the form of gas was removed from immobilized bioreactors. Each of immobilized bioreactors has a gas outlet 84 through which undesired process gases are removed. Gas outlets 84 all connect into a common conduit 86 leading to a venturi on an ozone gas stream conduit 88. The waste gas is completely oxidized so that there is no offensive odour upon release to atmosphere. The waste gas passing through common conduit 86 results in a preoxidization of the waste gas, as some of the immobilization bioreactors vent excess oxygen.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of treating waste water, comprising the step of:

firstly, providing specially acclimatized microbial consortia with relatively low sensitivity to changes in pH and changes in temperature, such that the microbial consortia is capable of metabolizing contaminants efficiently within a predetermined broad pH range and broad temperature range;

secondly, maintaining the microbial consortia in a space limited mode within an immobilized bioreactor operating within the predetermined pH range and the predetermined temperature range; and thirdly, introducing waste water with liquified insoluble organic contaminants into the immobilized bioreactor, the organic contaminants being metabolized by the microbial consortia working under space limited conditions, thereby treating the waste water with a minimal sludge production rate.

2. The method of treating waste water as defined in claim 1, the microbial consortia being in both a space limited and a substrate limited mode.

3. The method of treating waste water as defined in claim 2, the microbial consortia being capable of metabolizing contaminants efficiently within a broad pH range from 5.1 to 9.0.

4. The method of treating waste water as defined in claim 3, having an anaerobic immobilized bioreactor, an anoxic immobilized bioreactor, an aerobic immobilized bioreactor, and a nitrification immobilized bioreactor arranged in a desired series order to accommodate a continuous flow of waste water.

5. The method of treating waste water as defined in claim 1, the microbial consortia being capable of metabolizing contaminants efficiently at pH levels of less than 7.0.

6. The method of treating waste water as defined in claim 1, the microbial consortia being capable of metabolizing contaminants efficiently within a temperature range from 10 degrees to 38 degrees centigrade.

7. A method of treating waste water, comprising the steps of:

firstly, providing specially acclimatized microbial consortia with relatively low sensitivity to changes in pH and changes in temperature, such that the microbial consortia is capable of metabolizing contaminants efficiently within a predetermined broad pH range and broad temperature range;

secondly, providing at least one immobilized bioreactor with a substantially vertical plug flow pattern and operating the immobilized bioreactor within the predetermined pH range and the predetermined temperature range;

thirdly, immobilizing the microbial consortia within pores of an immobilized media positioned within the at least one immobilized bioreactor; and fourthly, introducing waste water with liquified organic contaminants into the at least one immobilized bioreactor, the flow through the at least one immobilized bioreactor sheering microbial consortia from an exposed surface of the immobilized media to maintain a biofilm thickness of less then 500 microns, thereby maintaining the microbial consortia in a space limited and a substrate limited mode, the organic contaminants being metabolized by the space limited and substrate limited microbial consortia thereby treating the waste water with a minimal sludge production rate.

8. The method of waste water treatment as defined in claim 7, having a two stage nitrification immobilized bioreactor with a first plug flow stage and a second continuously mixing stage.

9. The method of waste water treatment as defined in claim 7, having NO3 and NO2 produced within the nitrification immobilized bioreactor routed to the anoxic immobilized bioreactor to be converted into N2, nitrogen gas and NO2.

10. The method of waste water treatment as defined in claim 7, having the microbial consortia acclimatized to metabolize ammonia efficiently independent of Ph.

11. The method of waste water treatment as defined in claim 10, having a porosity of 45 pores per inch.

12. The method of waste water treatment as defined in claim 7, having a porosity of between 20 and 45 pores per inch in the immobilized media of the immobilized bioreactor.

13. The method of waste water treatment as defined in claim 7, having a porosity of between 30 and 60 pores per inch in the immobilized media of the nitrification immobilized bioreactor.

14. The method of waste water treatment as defined in claim 13, having the stream exiting the polishing immobilized bioreactor introduced into an ozone disinfection tank, thereby destroying any microorganisms remaining in the treated waste water stream.

15. The method of waste water treatment as defined in claim 14, having an angle of 45 degrees.

16. The method of waste water treatment as defined in claim 7, having the stream leaving the nitrification immobilized bioreactor introduced into a polishing immobilized bioreactor with a substantially vertical flow pattern and a heterogeneous microbial consortia, the flow through the polishing immobilized bioreactor sheering microbial consortia from exposed surfaces of the immobilized media to maintain a biofilm thickness of less then 500 microns, thereby maintaining the microbial consortia in a space limiting and substrate limiting mode, the organic contaminants being metabolized by the space limited and substrate limited microbial consortia thereby treating the waste water with a minimal sludge production rate.

17. The method of waste water treatment as defined in claim 7, having waste gases removed from each of the immobilized bioreactors to a common conduit leading to an ozone injector that eliminates unpleasant odours.

18. The method of waste water treatment as defined in claim 7, having a plug flow pattern with angles of between 30 and 60 degrees.

19. The method of waste water treatment as defined in claim 7, having a dissolved oxygen concentration of greater than four milligrams per litre in the aerobic immobilization bioreactor and the nitrification immobilization bioreactor.

20. A method of treating waste water, comprising the steps of:

firstly, providing specially acclimatized microbial consortia with relatively low sensitivity to changes in pH and changes in temperature, such that the microbial consortia is capable of surviving within a predetermined broad pH range and broad temperature range;

secondly, placing in series order to accommodate a continuous flow of waste water an anaerobic immobilized bioreactor, an anoxic immobilized bioreactor, an aerobic immobilized bioreactor, and a nitrification immobilized bioreactor, all of the immobilized bioreactors having a substantially vertical plug flow pattern and operating within the predetermined pH range and the predetermined temperature range;

thirdly, immobilizing the microbial consortia within pores of immobilized media positioned within each of the immobilized bioreactors;

fourthly, introducing a waste water stream with liquified organic contaminants into the anaerobic immobilized bioreactor in a substantially vertical plug flow pattern, the flow through the anaerobic immobilized bioreactor sheering microbial consortia from an exposed surface of the immobilized media to maintain a biofilm thickness of less then 500 microns, thereby maintaining the microbial consortia in a space limiting or substrate limiting mode, the organic contaminants being metabolized by the space limited and substrate limited microbial consortia thereby treating the waste water with a minimal sludge production rate;

fifthly, introducing the stream leaving anaerobic immobilized bioreactor into the anoxic immobilized bioreactor along with a carbon energy source in a substantially vertical plug flow pattern, the flow through the anoxic immobilized bioreactor sheering microbial consortia from an exposed surface of the immobilized media to maintain a biofilm thickness of less then 500 microns, thereby maintaining the microbial consortia in a space limiting and substrate limiting mode, the organic contaminants being metabolized by the space limited and substrate limited microbial consortia thereby treating the waste water with a minimal sludge production rate;

sixthly, introducing the stream leaving the anoxic immobilized bioreactor into the aerobic immobilized bioreactor along with at least 4 milligrams per litre of dissolved oxygen gas in a substantially vertical continuously stirred flow pattern, the high ratio of dissolved oxygen to contaminant solute concentration facilitating a portion of the microbial consortia going into an endogenous state, the flow through the aerobic immobilized bioreactor sheering microbial consortia from an exposed surface of the immobilized media to maintain a biofilm thickness of less then 500 microns, thereby maintaining the microbial consortia in a space limiting and substrate limiting mode, the organic contaminants being metabolized by the space limited and substrate limited microbial consortia thereby treating the waste water with a minimal sludge production rate;

seventhly, introducing the stream leaving the aerobic immobilized bioreactor into the nitrification immobilized bioreactor along with at least four milligrams per litre of dissolved oxygen gas in a substantially vertical flow pattern, the high dissolved oxygen to contaminant solute concentration resulting in a portion of the microbial consortia going into an endogenous state, the flow through the nitrification immobilized bioreactor sheering microbial consortia from an exposed surface of the immobilized media to maintain a biofilm thickness of less then 500 microns, thereby maintaining the microbial consortia in a space limiting and substrate limiting mode, the organic contaminants being metabolized by the space limited and substrate limited microbial consortia thereby treating the waste water with a minimal sludge production rate.

\* \* \* \* \*